(12) United States Patent
Chen (10) Patent No.: US 7,810,406 B2
(45) Date of Patent: Oct. 12, 2010

(54) CIRCULATING ASSEMBLY FOR A BALL SCREW

(75) Inventor: Xin-He Chen, Taichung (TW)

(73) Assignee: Hiwin Technologies Corp., Taichung (TW)

( * ) Notice: Subject to any disclaimer, the term of this patent is extended or adjusted under 35 U.S.C. 154(b) by 1017 days.

(21) Appl. No.: 11/554,171

(22) Filed: Oct. 30, 2006

(65) Prior Publication Data

US 2008/0098840 A1    May 1, 2008

(51) Int. Cl.
*F16H 25/22*    (2006.01)
(52) U.S. Cl. .................................. 74/424.86
(58) Field of Classification Search .............. 74/424.86, 74/424.87, 424.82
See application file for complete search history.

(56) References Cited

U.S. PATENT DOCUMENTS

| 2,502,066 | A | * | 3/1950 | Tanner | 74/424.75 |
| 4,357,838 | A | * | 11/1982 | Blaurock et al. | 74/424.87 |
| 6,425,302 | B2 | * | 7/2002 | Greubel | 74/424.87 |
| 6,561,053 | B2 | * | 5/2003 | Greubel | 74/424.87 |

* cited by examiner

*Primary Examiner*—William C Joyce
(74) *Attorney, Agent, or Firm*—Banger Shia (57) ABSTRACT

A circulating assembly for a ball screw comprises a cassette and a separator. The fitting hole of the cassette facilitates the installation of the balls, and the separator is inserted in the fitting hole of the cassette, and the sub-return path in the front end of the separator cooperates with the main return path of the cassette to smoothly guide the circulation of the balls, so that the balls can be installed easily and quickly. And the helical groove of the screw doesn't need to extend to the shoulder portion thereof.

9 Claims, 8 Drawing Sheets

CIRCULATING ASSEMBLY FOR A BALL SCREW

BACKGROUND OF THE INVENTION

1. Field of the Invention

The present invention relates to a ball screw, and more particularly to a circulating assembly for a ball screw that can be assembled easily and quickly.

2. Description of the Prior Art

Nowadays, ball screw is used more and more widely in modern industries. As a linear transmission means, the ball screw not only has high precision but also has the advantages of low frictional loss, high energy conversion ratio, low noise and high rigidity. Hence, it is self-evident that the ball screw is very important to various industrial mechanisms.

In order for the balls between the screw and the nut to circulate smoothly and for relieving the stress therebetween, the nut is usually provided at both ends thereof with two circulation cassettes for cooperating with the threads of the screw and the balls. And the circulation cassette is a key structure for enabling the balls circulation from the screw and the nut. Therefore, how to develop an improved and competitive circulation cassette is the common goal that the manufactures are striving for.

Figure 1:
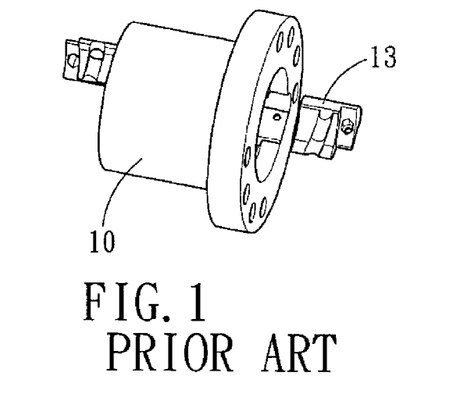
FIG. 1 shows how to install a conventional circulating assembly for a ball screw disclosed in U.S. Pat. No. 4,357, 838.
Figure 2:
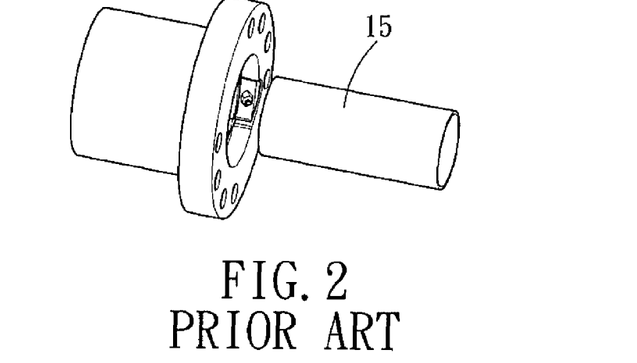
FIG. 2 shows how to install a conventional sleeve for the ball screw disclosed in U.S. Pat. No. 4,357,838.
Figure 3:
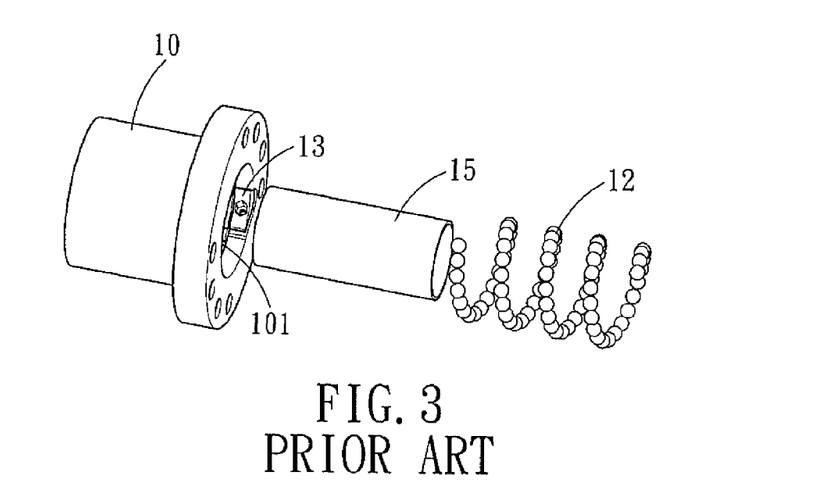
FIG. 3 shows the sleeve and balls for the ball screw disclosed in U.S. Pat. No. 4,357,838.
Figure 4:
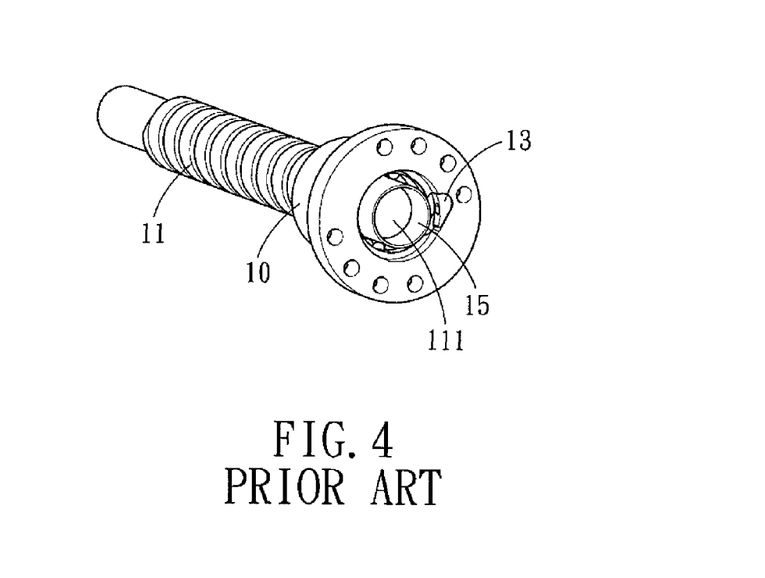
FIG. 4 is an assembly view of the ball screw disclosed in U.S. Pat. No. 4,357,838.
Figure 5:
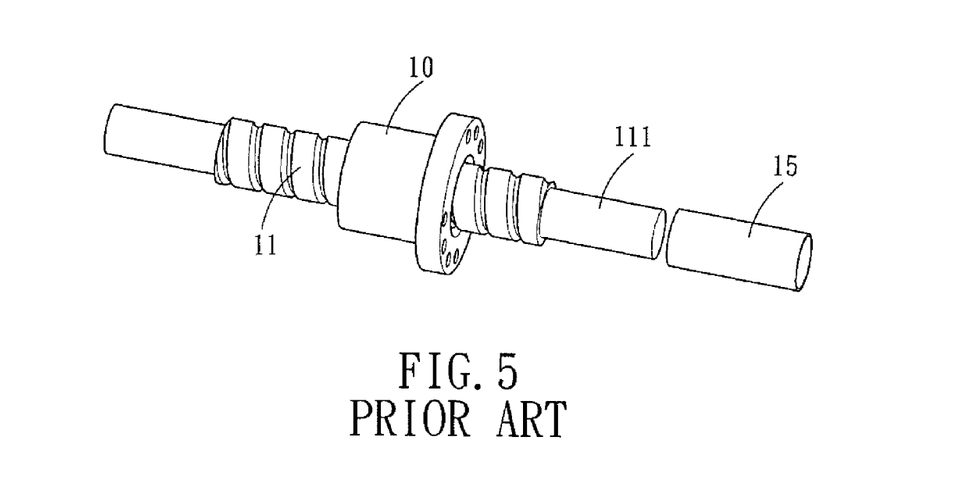
FIG. 5 shows that the sleeve is being disengaged from the ball screw disclosed in U.S. Pat. No. 4,357,838.

The conventional circulating assemblies are essentially classified into two categories: axial assembly (as shown in FIG. 1), and radial assembly (not shown). Please refer to the following detailed description:

Axial assembly:

FIG. 1 shows a ball screw of axial assembly type disclosed in U.S. Pat. No. 4,357,838, which comprises: a nut 10, a screw 11, a plurality of balls 12 and a circulating element 13. The circulating element 13 is installed into the end surface of the nut 10 for guiding the balls 12 into the circulation hole (not shown) of the nut 10. A very important portion of the circulating element 13 is called nail portion 14 that inserts into the threads of the nut 10 for guiding the balls 12 into the nut 10, and the helical grooves can be jointed smoothly by the integrally formed nail portion 14 of the circulating element 13.

The balls 12 are installed in the nut by the following steps:

1. installing the circulating element 13 into the nut 10 via the axial end surface thereof;
2. inserting a sleeve 15 into the nut 10, so as to enable the installation of the balls 12 later on;.
3. installing the balls 12 into the helical groove of the nut 10, at this moment, the balls 12 are confined in the helical groove by the sleeve 15 without falling off;
4. inserting a shoulder portion 111 of a screw 11 having an open helical groove through the sleeve 15, screwing the screw 11 into the nut 10, at this moment, both ends of the helical groove of the screw 11 must be open (the helical groove must extend to the shoulder portion 111), then the balls 12 can be installed successfully;
5. pulling out the sleeve 15, and the installation of the balls 12 is finished.

The balls 12 installation method and the design of the screw 11 have the following disadvantages:

First, although this circulating element 13 has the advantages of smooth rolling path and high rotation speed, since the nail portion 14 is engaged in the helical groove 101 of the screw 11, any end of the helical groove 101 must be open so as to facilitate the installation of the nail portion 14 of the circulating element 13. In other words, the helical groove must extend to the shoulder portion of the screw 11, and the helical groove leaves a notch in the in the abutting surface of the shoulder portion 111, as a result, the integrality of the diameter of the abutting surface is damaged (the outer periphery of the abutting surface on the shoulder portion 111 is not round). When both ends of the screw 11 are mounted on bearing seats of a machine (not shown), and the motor of the machine starts to rotate the screw 11, the rotation inertia will effect an axial load on both ends of the screw 11. And due to the integrality of the diameter of the abutting surface is damaged, the axial load cannot be evenly distributed on the both ends of the screw 11. This will generate great pressure against the end surface (not shown) of the bearing seats, causing damage to the bearing seats, as a result of that, the screw 11 will be deformed during rotation, adversely affecting the circulation of the rolling elements, but will reduce the service life of the screw shaft. Therefore, it is uneconomical.

Second, the sleeve 15 should be inserted in the nut before installing the balls 12, and then should be taken out of the nut carefully by rotating the screw 11, therefore, the assembling process is complicated and time-consuming.

The present invention has arisen to mitigate and/or obviate the afore-described disadvantages.

SUMMARY OF THE INVENTION

The primary objective of the present invention is to provide a circulating assembly for a ball screw, wherein the helical groove doesn't need to extend to the shoulder portion of the screw shaft.

To obtain this objective, the circulating assembly for a ball screw in accordance with the present invention comprises a cassette and a separator. The fitting hole of the cassette facilitates the installation of the balls, the separator is inserted in the fitting hole of the cassette, and the sub-return path in the front end of the separator cooperates with the main return path of the cassette to smoothly guide the circulation of the balls. With the design of the present invention, the helical groove of the screw doesn't need to extend to the shoulder portion thereof, and the disadvantages of the prior art can be overcome.

The secondary objective of the present invention is to provide a circulating assembly for a ball screw that can be assembled easily and quickly.

The fitting hole of the cassette facilitates the installation of the balls, and the separator is inserted in the fitting hole of the cassette, so that the balls can be installed easily and quickly.

DETAILED DESCRIPTION OF THE PREFERRED EMBODIMENTS

The present invention will be more clear from the following description when viewed together with the accompanying drawings, which show, for purpose of illustrations only, the preferred embodiment in accordance with the present invention.

Referring to FIGS. 6-14, a circulating assembly in accordance with an embodiment of the present invention is illustrated and comprises: a nut 20, a screw 30, a circulating assembly 40 and a plurality of balls 50.

Figure 6:
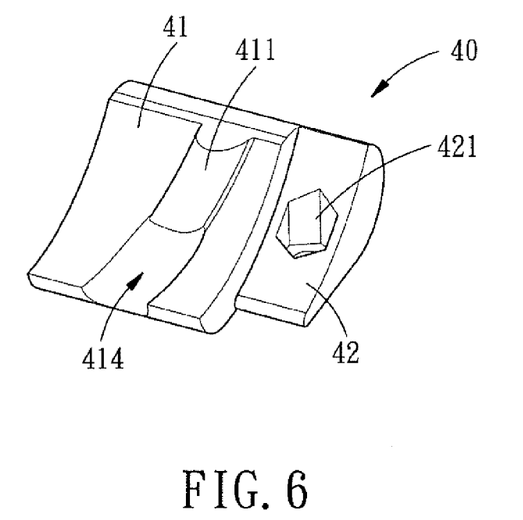
FIG. 6 is an assembly view of a circulating assembly for a ball screw in accordance with the present invention.
Figure 7:
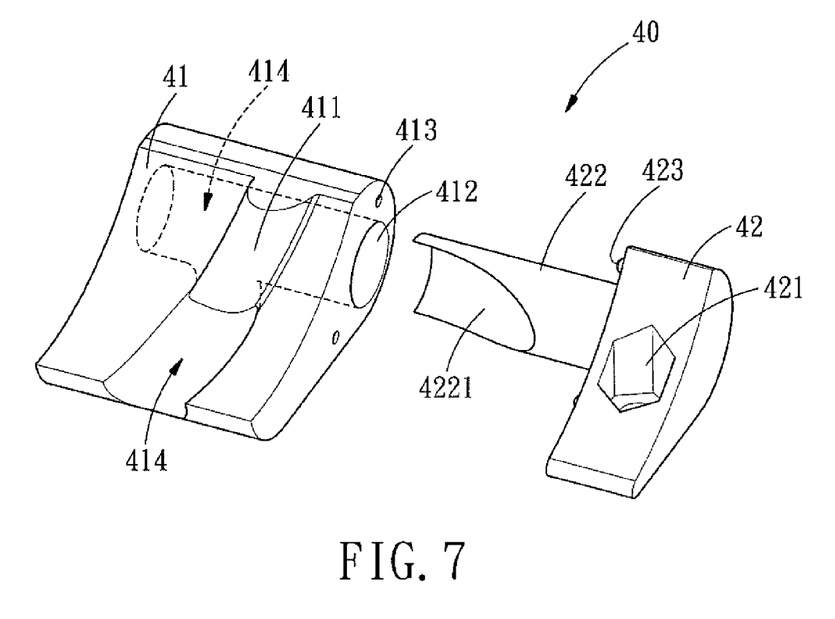
FIG. 7 is an exploded view of the circulating assembly for a ball screw in accordance with the present invention.
Figure 10:
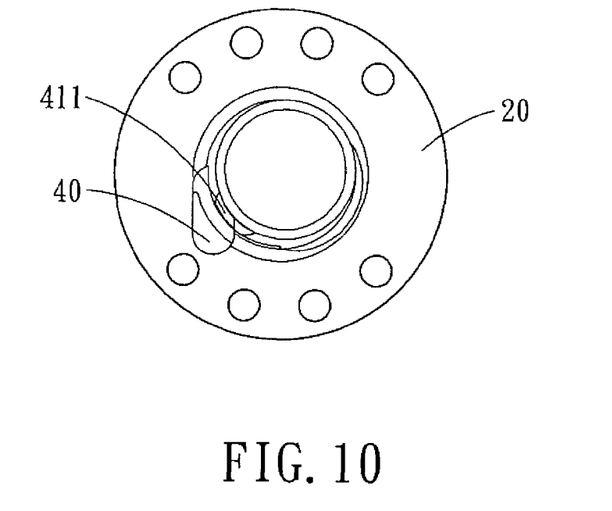
FIG. 10 shows the rear end surface of the nut for a ball screw in accordance with the present invention.

The nut 20 includes a circulating hole 21 penetrating the body thereof, a helical groove 22 formed in the inner surface of the circulating hole 21, and a recess 23 formed in the end surface of the nut 20 and located correspondingly to the helical groove 22 and the circulating hole 21. Beside the recess 23 is formed a threaded hole 231.

The screw 30 is defined in its outer surface with a helical groove 31 and is inserted in the nut 20. The helical groove 31 cooperates with the helical groove 22 of the nut 20 to define a space for receiving the plurality of balls.

The circulating assembly 40 includes a cassette 41 and a separator 42.

The cassette 41 includes a nail portion 411, a fitting hole 412, engaging holes 413 surrounding the fitting hole 412, and a main return path 414. The nail portion 411 is inserted in the helical groove 22 of the nut 20. The main return path 414 is connected between the circulating hole 21 of the nut 20 and the helical grooves 21, 31. The fitting hole 412 is a through hole extending outward from the main return path 414, and the diameter of the fitting hole 412 is larger than that of the balls A so as to allow the passage of the balls.

The separator 42 includes a mounting hole 421, an inserting rod 422, and engaging blocks 423 surrounding the inserting rod 422. The inserting rod 422 is inserted in the fitting hole 412 of the cassette 41, and in the front end of the inserting rod 422 is formed a sub-return path 4221 that is to be connected to the main return path 414 of the cassette 41 for guiding the balls A into and out of the circulating hole 21. The mounting hole 421 of the separator 42 is positioned in the threaded hole 231 of the nut 20 by screw B, and the engaging blocks 423 are engaged in the engaging holes 413.

The mounting hole 421 of the separator 42 is positioned in the threaded hole 231 of the nut 20 by screw B, so as to fix the circulating assembly 40. However, the mounting hole 421 can also be defined in the cassette 41 directly, and the separator 42 can be positioned in the fitting hole 412 of the cassette 41 directly by the inserting rod 422 or by screw. The relative position of the abovementioned components and structures can be changed according to design.

Figure 8:
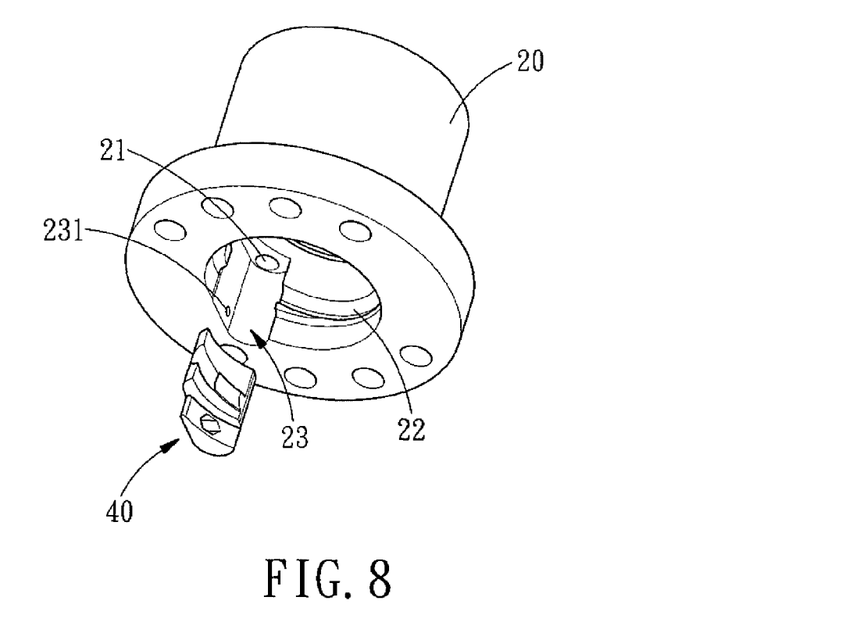
FIG. 8 is an installation view of the circulating assembly in accordance with the present invention.
Figure 9:
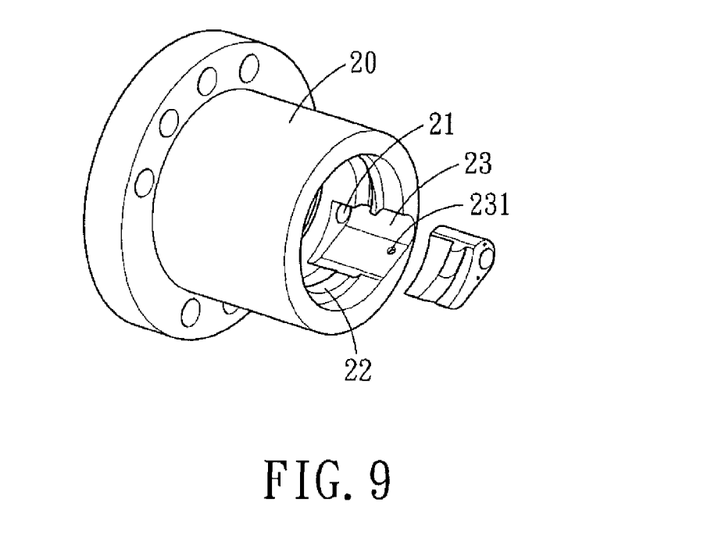
FIG. 9 is another installation view of the circulating assembly in accordance with the present invention.

In assembly, with reference to FIGS. 8 and 9, the cassette 41 of the two circulating assemblies 40 is inserted in the recess 23 at both ends of the nut 20 in such a manner that the main return path 414 of the cassette 41 is connected between the circulating hole 21 and the helical groove 22 of the nut 20.

Figure 11:
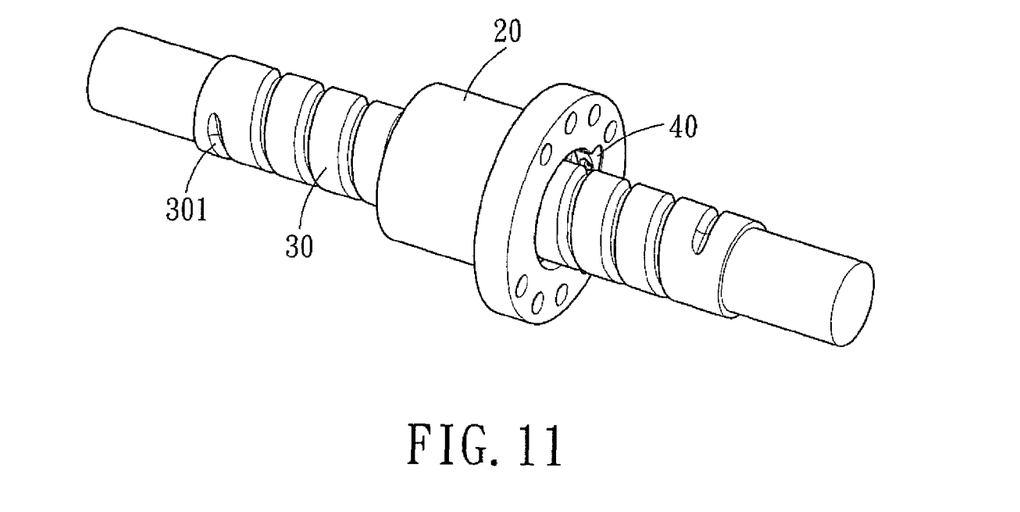
FIG. 11 is an installation view for the screw in accordance with the present invention.

And then, the screw 30 is inserted through the nut 20, the helical groove 31 of the screw 30 will cooperate with the helical groove 22 of the nut 20 to define a space for accommodation of a plurality of balls A. At this moment, the screw 30 is eccentrically disposed, so that it can be prevented from being interfered with by the nail portion 411 of the cassette 41.

Figure 12:
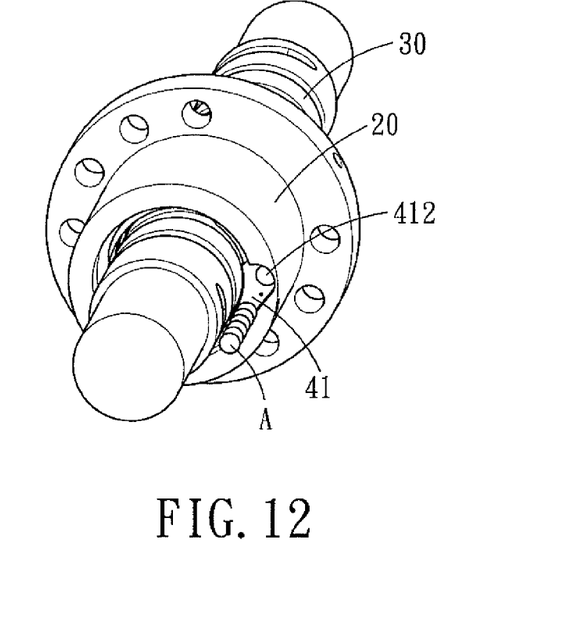
FIG. 12 is an installation view in accordance with the present invention of showing how to install the balls.

After that, a plurality of balls A is put into place. Since the fitting hole 412 is a through hole extending outward from the main return path 414, and the diameter of the fitting hole 412 is larger than that of the balls A, so that the balls A can enter the main return path 414 via the fitting hole 412, and then enter the space between the circulating hole 21 of the nut 20 and the helical grooves 21, 31.

Figure 13:
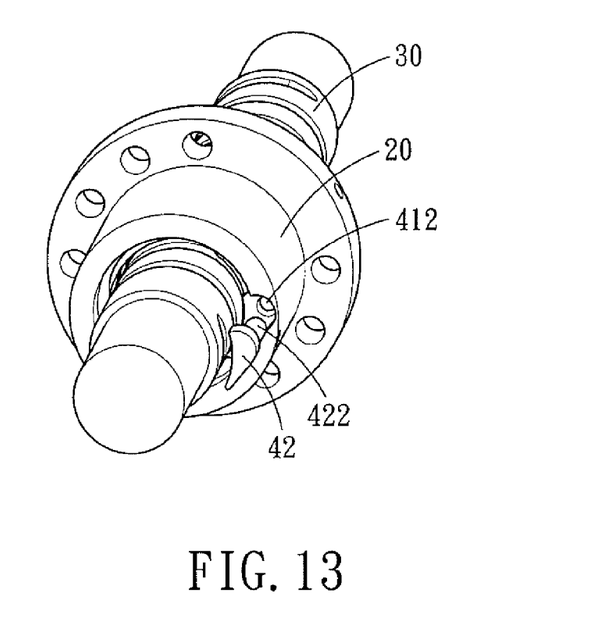
FIG. 13 is an installation view in accordance with the present invention of showing how to install the separator.

After the balls A are put into place in the nut, the inserting rod 422 of the separator 42 is inserted in the fitting hole 412 of the cassette 41. The sub-return path 4221 is formed in the front end of the separator 42 and is connected to the main return path 414 of the cassette 41, so as to smoothly guide the circulation of the balls A. Further, the engaging blocks 423 are engaged in the engaging holes 413, so that the sub-return path 4221 can be positioned precisely and can be prevented from being interfered with by the main return path 414.

Figure 14:
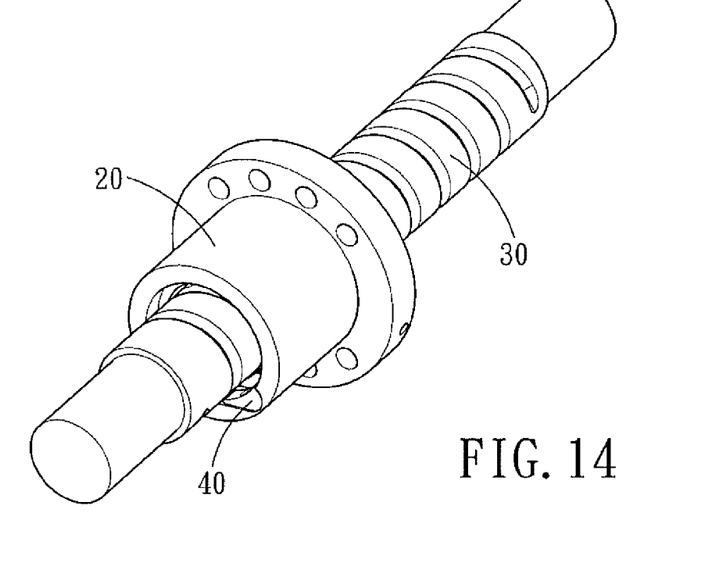
FIG. 14 is an assembly view of showing the ball screw in accordance with the present invention.

Finally, the mounting hole 421 of the separator 42 is positioned in the threaded hole 231 of the nut 20 by screw B, and thus the circulating assemblies 40 are positioned in the nut 20.

The abovementioned assembly method and the design of the structure can obtain the following objectives:

1. The circulating assembly includes a cassette and a separator, the fitting hole of the cassette facilitates the installation of the balls, and the separator is inserted in the fitting hole of the cassette, and the sub-return path in the front end of the separator cooperates with the main return path of the cassette to smoothly guide the circulation of the balls. With the design of the present invention, the helical groove of the screw doesn't need to extend to the shoulder portion thereof, and the disadvantages of the prior art can be overcome.

2. The fitting hole of the cassette facilitates the installation of the balls, and the separator is inserted in the fitting hole of the cassette, so that the balls can be installed easily and quickly.

Figure 17:
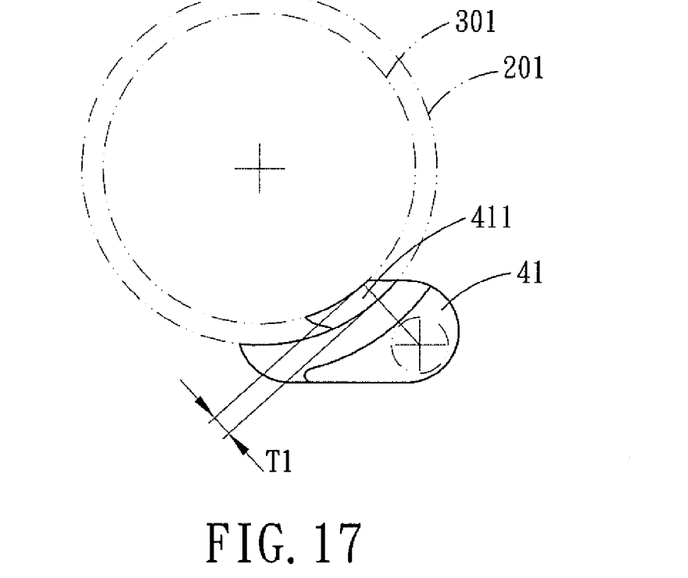
FIG. 17 is an illustrative view of showing the height of the nail portion protruding out of the cassette of the circulating assembly.
Figure 18:
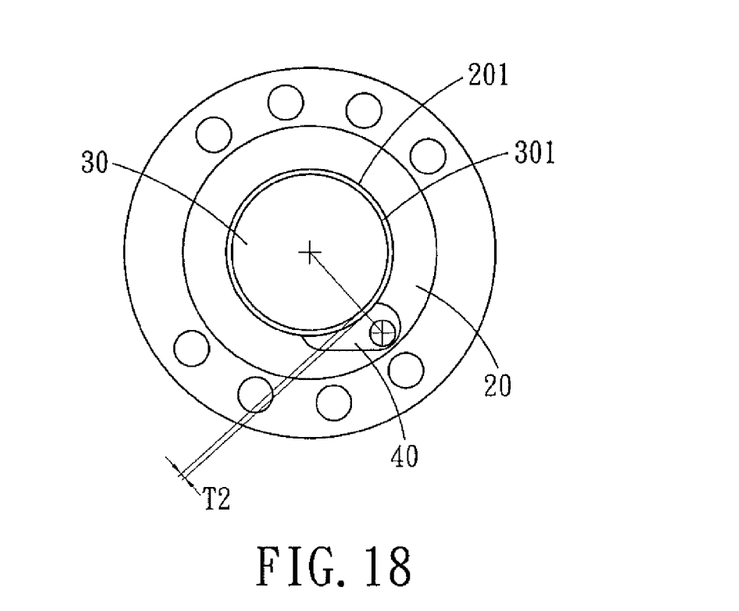
FIG. 18 is an illustrative view of showing the outer diameter of the screw and the inner diameter of the nut in accordance with the present invention.

It is to be noted that in order to prevent the screw 30 from being interfered with by the nail 411 of the cassette 41 when it is being eccentrically inserted into the nut, the present invention specially designs two critical data as follows:

The height T1 of the nail portion 411 protruding out of the cassette 41 of the circulating assembly 40 is smaller than or equal to two times the distance T2 from the outer diameter 301 of the screw 30 to the inner diameter 201 of the nut 20, that is: $T1 \leq 2 \times T2$.

Figure 15:
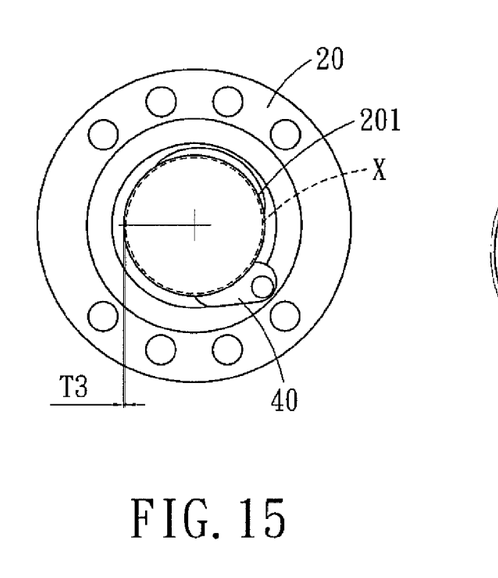
FIG. 15 is an illustrative view of showing the pitch circle diameter and the inner diameter of the nut in accordance with the present invention.
Figure 16:
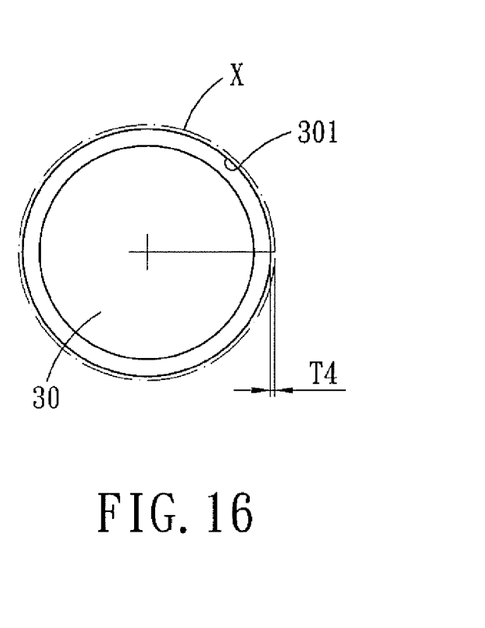
FIG. 16 is an illustrative view of showing the pitch circle diameter and the outer diameter of the screw in accordance with the present invention.

The height T1 of the nail portion 411 protruding out of the cassette 41 of the circulating assembly 40 is smaller than or equal to two times the distance T3 from the outer diameter 301 of the screw 30 to pitch circle diameter X, or, The height T1 of the nail portion 411 protruding out of the cassette 41 of the circulating assembly 40 is smaller than or equal to two times the distance T4 from the inner diameter of the nut 20 to pitch circle diameter X, that is, T1<=2×T3 or T1<=2×T4.

To summarize, the present invention comprises a cassette and a separator. The fitting hole of the cassette facilitates the installation of the balls, and the separator is inserted in the fitting hole of the cassette, and the sub-return path in the front end of the separator cooperates with the main return path of the cassette to smoothly guide the circulation of the balls. With the design of the present invention, the helical groove of the screw doesn't need to extend to the shoulder portion thereof, and the disadvantages of the prior art can be overcome.

While we have shown and described various embodiments in accordance with the present invention, it is clear to those skilled in the art that further embodiments may be made without departing from the scope of the present invention.

What is claimed is:

1. A circulating assembly for a ball screw being disposed on a nut having a circulating hole for guiding balls between the nut and the screw into and out of the circulating hole, the circulating assembly comprising a cassette and a separator; wherein:

the cassette is formed with a main return path for connecting to the circulating hole of the nut, a fitting hole extends outward from the main return path; and the separator is inserted in the fitting hole of the cassette, a sub-return path is formed at a front end of the separator and is connected to the main return path, and the sub-return path cooperates with the main return path to guide the circulation of the balls;

the nut including the circulating hole and a helical groove winding around inner surface of the nut, a recess being formed in an end surface of the nut and located correspondingly to the helical groove and the circulating hole;

the cassette further includes a nail portion inserted in the helical groove of the nut, the main return path is connected between the circulating hole of the nut and the helical groove, the fitting hole is a through hole extending outward from the main return path; and the separator includes an inserting rod to be inserted in the fitting hole of the cassette, and the sub-return path is located at a front end of the inserting rod.

2. The circulating assembly for a ball screw as claimed in claim 1, wherein:

the nut has a threaded hole formed in the recess; and
the separator further includes a mounting hole to be positioned in the threaded hole of the nut by screw.

3. The circulating assembly for a ball screw as claimed in claim 1, wherein the cassette further includes a plurality of engaging holes surrounding the fitting hole, the separator includes a plurality of engaging blocks surrounding the inserting rod, and the engaging blocks are to be engaged in the engaging holes after the separator is assembled to the cassette.

4. The circulating assembly for a ball screw as claimed in claim 2, wherein the cassette further includes a plurality of engaging holes surrounding the fitting hole, the separator includes a plurality of engaging blocks surrounding the inserting rod, and the engaging blocks are to be engaged in the engaging holes after the separator is assembled to the cassette.

5. The circulating assembly for a ball screw as claimed in claim 1, wherein a height T1 of the nail portion protruding out of the cassette of the circulating assembly is smaller than or equal to two times a distance T2 from an outer diameter of the screw to an inner diameter of the nut, that is: T1<=2×T2.

6. The circulating assembly for a ball screw as claimed in claim 5, wherein the height T1 of the nail portion protruding out of the cassette of the circulating assembly is smaller than or equal to two times a distance T3 from an outer diameter of the screw to pitch circle diameter, that is: T1<=2×T3.

7. The circulating assembly for a ball screw as claimed in claim 5, wherein the height T1 of the nail portion protruding out of the cassette of the circulating assembly is smaller than or equal to two times a distance T4 from an inner diameter of the nut to pitch circle diameter, that is, T1<=2×T4.

8. The circulating assembly for a ball screw as claimed in claim 1, wherein a height T1 of the nail portion protruding out of the cassette of the circulating assembly is smaller than or equal to two times a distance T3 from an outer diameter of the screw to pitch circle diameter, that is: T1<=2×T3.

9. The circulating assembly for a ball screw as claimed in claim 1, wherein a height T1 of the nail portion protruding out of the cassette of the circulating assembly is smaller than or equal to two times a distance T4 from an inner diameter of the nut to pitch circle diameter, that is, T1<=2×T4.

* * * * *